United States Patent [19]

Alberter et al.

[11] Patent Number: 4,738,031

[45] Date of Patent: Apr. 19, 1988

[54] METHOD FOR ESTABLISHING THE DRIVING DIRECTION OF A VEHICLE WITH AN ELECTRONIC COMPASS

[76] Inventors: Günter Alberter, Nordring 122; Harald Bauer, Chamerstrasse 25, both of 8500-Nürnberg; Reinhard Helldörfer, Rosenstrasse 9, 8423 Igelsdorf; Peter Ittner, Alberichstrasse 8, 8500 Nürnberg; Hans Rauch, Distelweg 9, 8510 Fürth 9, all of Fed. Rep. of Germany

[21] Appl. No.: 5,030

[22] PCT Filed: Nov. 27, 1985

[86] PCT No.: PCT/DE85/00494

§ 371 Date: Nov. 17, 1986

§ 102(e) Date: Nov. 17, 1986

[87] PCT Pub. No.: WO86/05584

PCT Pub. Date: Sep. 25, 1986

[30] Foreign Application Priority Data

Mar. 13, 1985 [DE] Fed. Rep. of Germany ....... 3509548

[51] Int. Cl.[4] .............................................. G01C 17/38
[52] U.S. Cl. .......................................... 33/356; 33/361
[58] Field of Search ................ 33/356, 361; 73/1 E; 364/559, 571

[56] References Cited

U.S. PATENT DOCUMENTS

| 4,416,067 | 11/1983 | Scherer et al. ................. | 33/356 |
| 4,445,279 | 5/1984 | Tsushima et al. ............... | 33/356 |
| 4,497,034 | 1/1985 | Kuno et al. .................... | 33/361 |
| 4,611,293 | 9/1986 | Hatch et al. ................... | 33/356 |
| 4,660,161 | 4/1987 | Okada ........................... | 33/356 |
| 4,672,565 | 6/1987 | Kuno et al. .................... | 33/356 |

FOREIGN PATENT DOCUMENTS

| 41892 | 12/1981 | European Pat. Off. . | |
| 2754888 | 6/1979 | Fed. Rep. of Germany . | |
| 3345818 | 6/1985 | Fed. Rep. of Germany ........ | 33/356 |
| 3422491 | 1/1986 | Fed. Rep. of Germany . | |
| 85910 | 5/1984 | Japan ..................................... | 33/361 |
| 2130729 | 6/1984 | United Kingdom . | |

Primary Examiner—Richard R. Stearns
Attorney, Agent, or Firm—Michael J. Striker

[57] ABSTRACT

A method for establishing the driving direction of a motor vehicle is suggested with an electronic compass which is provided with a magnetometer having two probes being turned by 90° with respect to each other and an evaluation circuit. For establishing the ground field (He) and its angle ($\phi'$) in a vector diagram (X,Y) at first the measuring points (M1 ... M4) with the maximum and minimum values (x,y) of the elliptical polar frequency (O) of the magnetic field (H) measured on the magnotemeter by turning the vehicle are picked up and from this the vector of a fixed interference field (Hs) with the coordinates of the center point (P) is established as a parameter of the polar frequency (O). Thereafter, the measuring points (M5 ... M8) of the magnetic field (H) with the maximum and minimum distances of the points on the polar frequency (O) with respect to its center point (P) are picked up and from this the length of the semiaxis (a,b) are established as parameters of the polar frequency (O). The rotating angle ($\alpha$) of the polar frequency (O) is established as a parameter from the measuring values of one of these measuring points and the center point (P). Finally, during the drive the driving direction is calculated from the measured values of the magnetic field (H) and the established parameters of the polar frequency (O) by means of an algorithm (FIG. 2).

5 Claims, 2 Drawing Sheets (Indicator)

METHOD FOR ESTABLISHING THE DRIVING DIRECTION OF A VEHICLE WITH AN ELECTRONIC COMPASS

BACKGROUND OF THE INVENTION

The invention is based on a method for establishing the driving direction of a vehicle with an electronic compass in accordance with the type of the main claim. In a known navigation apparatus (DE-PS No. 27 54 888) the driving direction of a vehicle is established with a two-axis-magnetometer, whose output signals are fed to a correction unit for compensating magnetic interference fields in the vehicle. This solution is based on the assumption that an interference field is present in the vehicle which is superimposed to a ground field which is more or less screened by the chassis of the motor vehicle depending on the alignment of the vehicle. Thereby, a polar frequency is obtained for the measuring values of the magnetometer on the X and Y axis in the vector diagram by turning the vehicle, whose center point is displaced from the coordinate system of axes with the vector of the interference field and which forms an ellipse by the proportional change of the signals, whose axis extend parallel to the measuring axis in the vector diagram. Due to the proportional change of the one output signal, an ellipse should be formed into a circle and due to the zero point displacement the circle should be transferred to the coordinate system of the axes. This is checked by a control step in that the corrected signals are lifted to a square and must form a constant value when added (circular equation).

The correcting magnitudes which were established by the control stage must be established by scanning tests which are extremely cumbersome and erroneous. Moreover, in this manner only timely constant interference fields can be taken into consideration. A further, substantial disadvantage of the known method consists in that only an axis parallel displacement from the zero point has to be taken into consideration for the elliptical polar frequency of the weakened ground field, whereas the reality such an elliptical polar frequency is turned by an angular magnitude also in the vector diagram. Since this turning is not picked up in the known measuring method, a considerable deviation is obtained between the established and the actual driving direction with such an electronic compass.

SUMMARY OF THE INVENTION

It is a purpose of the present invention to establish the direction of the ground field or the driving direction of the vehicle as accurately as possible by establishing a very accurate actual polar frequency of the magnetic field which will become effective on the magnetometer.

A method in accordance with the invention for establishing the driving direction is advantageous in that measuring values are picked off a magnetic field effective on the magnetometer during the turning of the vehicle. All required parameters are established by a digital evaluation circuit. The values of dependent on the installation location of the magnetometer in the vehicle, which determines the center point displacement as well as the shape and the turning of the polar frequency of the magnetic field in the vector diagram. In this manner, it is possible to establish the exact direction of the ground field, the north direction or the driving direction, or the direction of a predetermined destination and to indicate the same in view of the constant measuring by the magnetometer through the established polar frequency.

It is particularly advantageous to pick up the changes of the driving direction while driving by an evaluation circuit, by measuring the magnetic field vector by means of a microcomputer when exceedng a predetermined value of a change in driving direction, the actually measured value is stored in the same vector diagram as a further measuring point of the polar frequency. The measuring points which were read-in are further processed by the computer for checking and, if need be, for correcting the established parameter of the polar frequency. Moreover, the values for the driving direction change together with the way signals of the vehicle may be used for determining the location of the vehicle. For establishing the zero point displacement of the polar frequency of the magnetic field measured by the magnetometer, it is advantageous that the four measuring points with the maximum and minimum measuring values are picked up and stored in the evaluation circuit during a full turning, for example, driving in a circle of the vehicle. During a second complete turning of the vehicle the largest and the smallest distance of the elliptical polar frequency response locus from its center point can be picked up and stored by the evaluation circuit from the constant measuring of the magnetic field by the magnetometer. Advantageously, the second turning of the vehicle can be eliminated in that during the first full turning or a circular drive of the vehicle, a plurality of further measuring points are picked up and stored by the evaluation circuit, in addition to the four measuring points with the maximum and the minimum measuring values, for establishing the parameter of the polar frequency of the measured magnetic field.

BRIEF DESCRIPTION OF THE DRAWINGS

One exemplified embodiment of the invention is illustrated in the drawing and is explained in detail in the subsequent description.

DESCRIPTION OF THE PREFERRED EMBODIMENT

Figure 1:
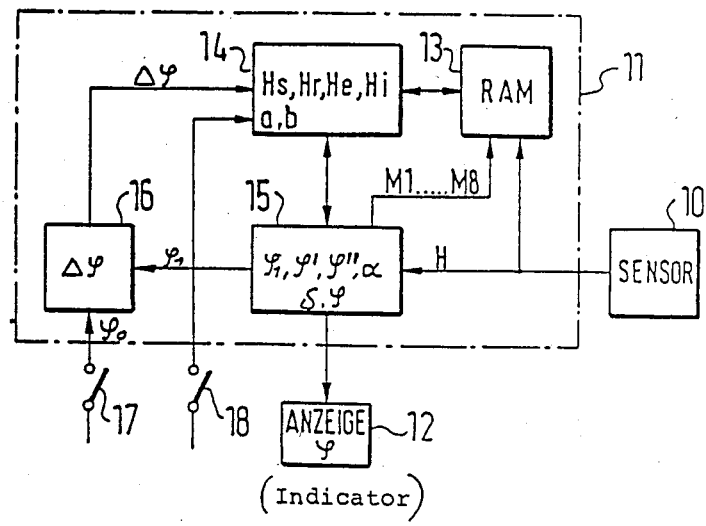
FIG. 1 illustrates a block circuit diagram of an electronic compass for establishing the driving direction of a vehicle in accordance with the invention.

FIG. 1 illustrates the block circuit diagram for an electronic compass which is stationarily installed in a motor vehicle for navigation. The electronic compass consists of a sensor 10, a digital evaluation circuit 11 and an indicator 12. For example, the sensor 10 is mounted in the center below the roof of the passenger motor vehicle and contains a magnetometer with a time code. The magnetometer may be a three-axis-magnetometer or a two-axis-magnetometer, whereby the axes of the magnetic field probes are oriented 90° with respect to each other. The magnetometer together with a current supply and a signal forming stage for each of the magnetic field probes are mounted in the sensor 10 in accordance with DE-OS No. 33 45 712. The evaluation circuit 11 is essentially realized by a microcomputer, whose input is fed with the sensor signals. For a better understanding of the method for establishing the driving direction of the vehicle the evaluation circuit 11 is separated into a storage stage 13, a computer stage 14 for calculating the parameters of a polar frequency of the measured magnetic field, a further computer stage 15 for determining the angle between the ground field and the driving direction as well as a correcting stage 16 for the angle correction. Thereby, a fixed direction angle φ can be fed to the correction stage 16 by means of a key switch 17. The calculating stage 15 is connected with the indicator 12 by means of an output on which the driving direction can be indicated in addition to further information. The evaluation circuit 11 for establishing the polar frequency is prepared with a key switch 18.

Figure 2:
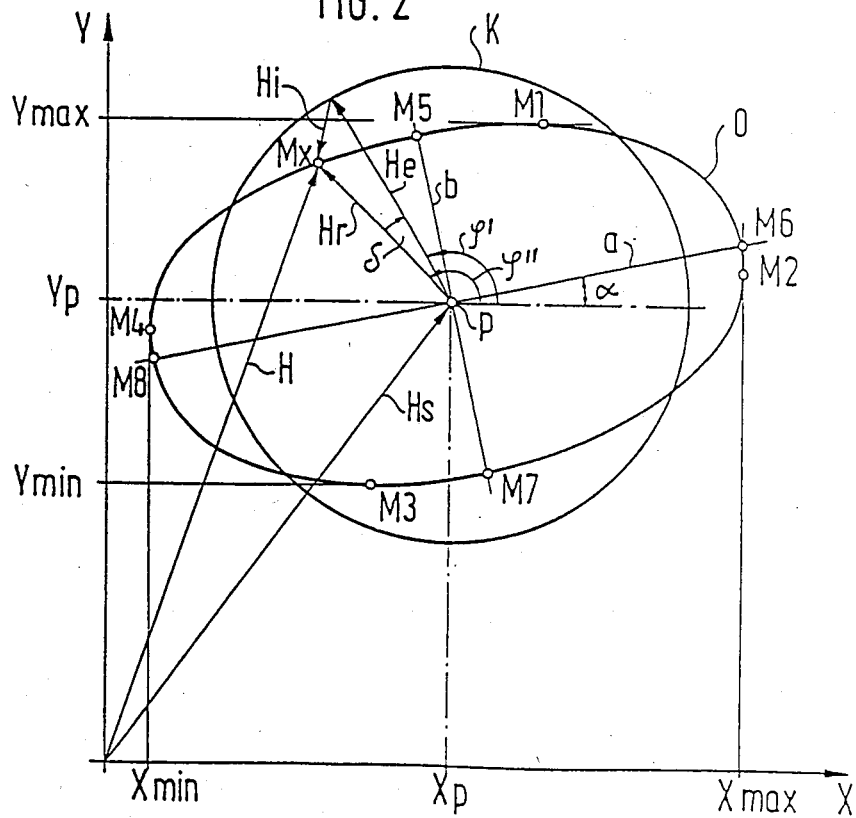
FIG. 2 illustrates a vector diagram with the polar frequency of the magnetic field measured by the compass.

The performance of the invention method for establishing the driving direction will now be explained in conjunction with FIGS. 2, 3 and 4. FIG. 2 illustrates the vector diagram for measuring the magnetic field in the motor vehicle 18 with a magnetometer which is mounted in sensor 10. The two probles measure the X-components or the Y-components of the magnetic field vector H, which are the result of the magnitude and the direction of the magnetic field measured by sensor 10.

Figure 3:
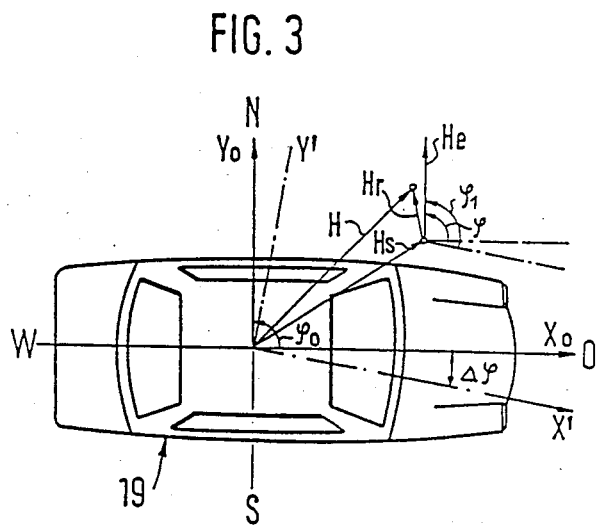
FIG. 3 illustrates a motor vehicle with the vector axis in a calibrated position and, FIG. 4 illustrates a flow diagram for the mode of operation of the electronic compass in accordance with FIG. 1.

FIG. 3 illustrates the vector H of the magnetic field with respect to the longitudinal axis $x_o$ and the axis $y_o$ which extends transversely with respect to the vehicle plane. Thereby, it is assumed that the sensor 10 is mounted in the center below the roof of the passenger vehicle 19. The magnetic field H which is measured at this location is composed of a fixed interference field Hs and the components Hr of the ground field He being effective in the vehicle. Although, the actual vector of the measured magnetic field is disposed obliquely in the space, it is sufficient for determining the driving direction, to measure only the vector H of the magnetic field projecting into the plane of driving by means of sensor 10.

For establishing the driving direction it is required to find the direction of the ground field He from the measured magnetic field vector H. For this purpose different successive method steps are required which are illustrated in a flow diagram in FIG. 4, which is cyclically passed through by the evaluation circuit 11.

Figure 4:
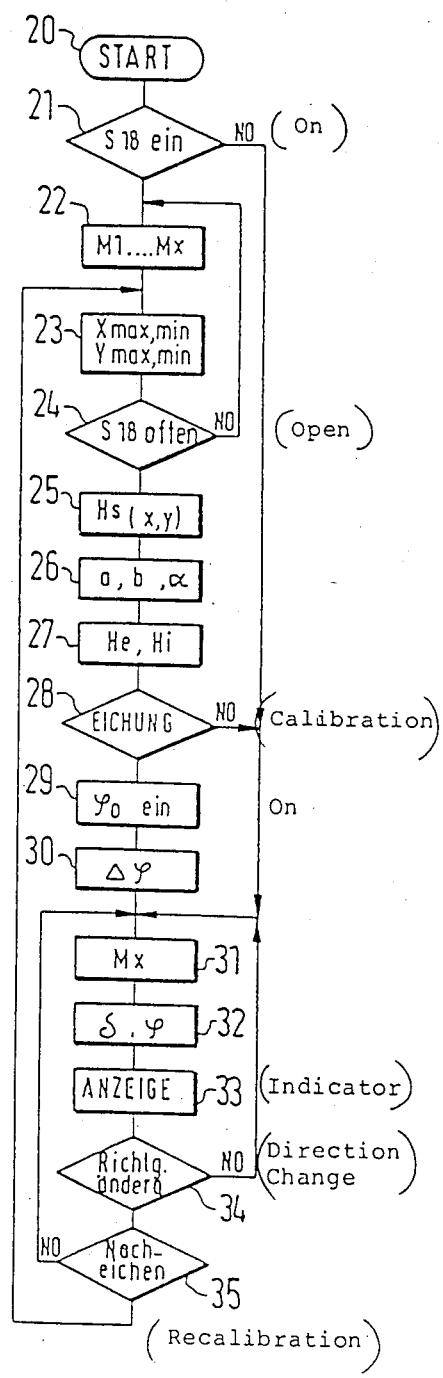

When switching on the supply voltage of the electronic compass the program is started at stage 20 in accordance with FIG. 4. In the following program step 21 it is tested whether the key switch 18 is closed. In order to establish the polar frequency O in FIG. 2 for vector H of the measured magnetic field, one must at first close the key switch 18 and the vehicle 19 must drive a closed circle. Thereby, the X- and Y-measuring values of the magnetic field H as measured by sensor 10 and which constantly change in magnitude and direction are picked up in a plurality of measuring points M1 . . . Mx and stored in a storage step 13. The picking up of the measuring points may be performed in defined time intervals during the circular drive of vehicle 19 or after driving along certain way sections which, for example, are picked up in the calculating step 14 of the evaluation circuit 11 by a motion pick up, not shown, through key switch 18. Simultaneously, the X and Y-values of the magnetic field H which are constantly measured by sensor 10 are monitored by calculating step 15 and the measuring points M1 to M4 with the maximum and minimum X and Y values are picked up in program step 23 by means of a differential member, for example, and are stored in storage step 13. Afterward the circular drive switch 18 is opened again in program step 24, since otherwise further measuring values Mx are permitted to enter. In accordance with FIG. 2, an elliptical polar frequency O is obtained from the measuring points which are present in storage step 13 which can be described by the following vector equation with respect to the coordinate system of axes of the vector diagram:

$$H = Hs + Hr$$

thereby Hs is the vector of the constant interference field being projected on the driving plane which is preestablished by the shape and the structure of the vehicle and Hr is the vector of a resulting magnetic field which is composed of a vector of the ground field He and an induced interference field Hi. The vector Hi of the induced interference field is dependent on the screening of the ground field by the vehicle chassis or by the magnetisation thereof generated by the ground field. In program step 25 the vector of the constant interference field Hs which had been established in step 23 by means of the maximum and minimum measuring values are now established in the calculating step 14 in accordance with the following equation:

$$Hs_{(x,y)} = \frac{H_{(x,y)} \max + H_{(x,y)} \min}{2}$$

the X and Y values of the constant interference field Hs which were successively established in accordance with this equation in calculating step 14 are stored in the storage step 13. In accordance with FIG. 2, the established polar frequency response locus O is elliptical which is displaced around the constant interference field vector Hs from the original axis of the vector diagram x, y and is turned with their axis by the angle α. Simultaneously with the stored values of the interference vector Hs the X and Y values for the center point P of the elliptical polar curve response locus O are also picked up and are stored as the first parameter of the polar frequency response locus O. In the next program section 26 the resulting magnetic field vector Hr is established from the stored measuring points M1 . . . Mx in accordance with the vector equation:

$$Hr = H - Hs.$$

Simultaneously therewith the measuring point M5 to M8 with the largest and the smallest vector Hr are picked up and stored as further parameters of the polar frequency response locus O in the calculating step 14. They correspond to the largest radius a and the smallest radius b of the elliptical frequency response locus O. From the X and Y values of the center point P and the X and Y values of one of the measuring points M5 to M8 for the largest or smallest radius a or b of the polar frequency response locus O from the center point P, also the turning angle α of the polar frequency response locus O in the vector diagram is established in the following equation in the same program section 26, for example, with the measuring point M6 in the calculating step 15.

$$OC = \text{arc } tg \frac{Yp - Y6}{Xp - X6}$$

whereby instead of the measuring point M6, the measuring point M8 can be selected with the coordinates $X_8$, $Y_8$. With a corresponding transformation of the formula the stored values of the measuring points M5 or M7 may be used with respect to the values of the center point P for calculating the angle $\alpha$. Favorable are the measuring points on the small half axis.

Since the ground field He remains unchanged during the circular drive of vehicle 19, the vector He of the ground field describes a circle K in vehicle 19 in accordance wth FIG. 2, whose center point P is identical with the elliptical polar frequency O. Therefore, in program step 27 the magnitude of the ground field He and the magnitude of the induced interference field Hi can be established in the calculating step 14 from the radiuses a and b of the elliptical polar frequency O as fixed parameters in accordance with the following equations and stored in the storage step 13:

$$He = \frac{a + b}{2} \; ; \; Hi = \frac{a - b}{2}$$

A similar calibration method defines the five elliptical parameters during a two time circular drive analogous to the described method. During the first circular drive the coordinates of the elliptical center point are determined. During the second circular drive the two half axes and the angle $\alpha$ are calculated. A lot of storage space can be saved with this method.

Thus all parameters which are required for establishing the driving direction during the subsequent drive are established and stored by the evaluation circuit 11. However, the angle $\alpha$ established for the driving direction still requires a correction, since it does not consider the so-called erroneous construction, namely the deviation of the ground field direction from the actual north pole. Moreover the installation tolerances during the mounting of the sensor 10 in vehicle 19 are not considered, so that the X-axis of the magnetometer disposed in the driving direction does not coincide with the longitudinal axis $x_o$ of the vehicle. In FIG. 3 this installation tolerance and the erroneous instruction is illustrated by a vector diagram with the illustrated dotted axis x' and y' which forms, together wth the vehicle axis $x_o$ and $y_o$, a turning around angle $\Delta\phi$. In order to compensate for these measuring errors the calibration of the electronic compass must be performed in program section 28.

For this purpose, the vehicle is pointed to a predetermined cardinal point, in the exemplified embodiment, to the east or is moved on a road, whereby the angle of the air-line distance between the starting point and the arrival point are known or can be measured from a map. Thus, an angle $\phi$ is obtained with respect to the actual north direction which in the exemplified embodiment is 90°. This fixed predetermined angle magnitude is fed as a fixed value in program section 29 into the correcting step 16 of the evaluation circuit 11, in accordance with FIG. 1, by actuating the key switch 17. At the same time, the direction of the ground field He is established in this vehicle position by the calculating step 14 and 15 due to the constsnt measuring of the polar frequency response locus O. The generated angle $\phi_1$ is also fed into the correcting step 16. Thereby, as FIG. 3 illustrates, $\phi_1$-indicates the angle which the ground field He forms with the axis x' of the vector diagram x', y'. In the following program section 30, a correcting angle $\Delta\phi$ is formed in the correcting step 16, whereby in accordance with the equation $$\Delta\phi = \phi_1 - \phi_o$$

the angle $\phi_o$ set by the longitudinal vehicle axis $x_o$ in a northerly direction is deducted from the value of the ground field He which had been established in the compass. The correcting angle $\Delta\phi$ which had been formed in this manner is stored in the correcting step 16 and is simultaneously fed to the calculating steps 14 and 15. This correcting angle compensates erroneous instructions and the installation tolerances, so that the angle $\phi$ in the calculating step 15 represents the actual angle of the longitudinal axis $x_o$ of the vehicle with respect to the northerly direction.

In the following program section 31, during the start of a drive, a new measuring value Mx on the polar frequency response locus O in FIG. 2 of the X and Y values as measured by the magnetometer of the sensor 10 are fed into the evaluation circuit 11. In light of the established parameter Hs, He, Hi, a, b and $\alpha$ the angle $\phi$ must now be established again in program section 32.

As illustrated in FIG. 2, a differential angle $\delta$ exists between the ground field vector He and the resulting magnetic field sector Hr. Since with the constant measuring of the magnetic field H on sensor 10 by the vector equation $H = Hs + Hr$ only the magnitude and the direction of the resulting field hr have to be established, the differential angle $\delta$ must still be established in the calculating step 15 in the program section 32 by means of the cosine equation in accordance with the following equation:

$$\delta = \text{arc cos } \frac{Hr^2 + He^2 - Hi}{2 Hr \cdot He} \; ;$$

or $$\frac{\delta}{2} = \text{arc } tg \sqrt{\frac{(U - Hr)(U - He)}{U(U - Hi)}} \; ;$$

$$\left( \text{with } U = \frac{Hr + He + Hi}{2} \right)$$

The angle $\phi''$ for the resulting magnetic field Hr in measuring point Mx with respect to X-axis in accordance with the equation results in $$\phi = \text{arc } tg \frac{Yx - Yp}{Xx - Xp},$$

so that finally the angle $\phi'$ of the ground field He is calculated in accordance with the equation $\phi' = \phi'' + K\delta$. Since the differential angle must be deducted or added depending on the position of the resulting magnetic field Hr with respect to angle $\phi''$, the result for the value K is:

$$K = \begin{array}{l} +1 \text{ for } \alpha < \phi'' < \alpha + 90° \text{ or } 180° < \phi'' < \alpha + 270° \\ -1 \text{ for } \alpha + 90° < \phi'' < \alpha \, 180° \text{ or } \alpha + 270° < \phi'' < \alpha + 360° \end{array}$$

The angle $\phi'$ of the ground field with respect to the vector diagram which had been established in this manner in the calculating step 15 can now be converted in a last step of the program section 32 by the calculating step 15 into the actual angle of the driving direction in northerly direction in accordance with the equation $$\phi = \phi' - \Delta\phi$$

In the program step 33 this value or the driving direction is indicated to the driver by means of the indicator 12.

In program step 34 it is now tested whether the vehicle with the continuous measuring point Mx reaches the elliptical polar frequency response locus O in the range of the measuring points M1 to M8 which were established for the calibration performance. As long as this is not the case, the program steps 31,32 and 33 are cyclically passed through and the driving direction or the angle $\phi$ between the driving direction and northerly direction is continuously indicated. However, if the measuring point Mx approaches one of the measuring points M1 to M8, this will be recognized in the program step 34 by the calculating step 15 and the measured value is at first intermediately stored in the storage step 13. In program step 35 it is tested whether the measured value is required for an aftercalibration of the electronic compass. This is the case when the measured value of the magnetic field H deviates from a predetermined magnitude from the polar frequency response locus O. In this case the program again jumps back to step 23 and it establishes in the subsequent steps the correspondingly corrected polar frequency response locus O with the new measuring value. However, if no deviation of the measured magnetic field H from the polar frequency response locus O are noted, the program jumps to the program step 31 for measuring the actual driving direction. This is also true for all further drives with vehicle 19 in which a calibration drive is no longer required. Therefore, after the start of the program the program jumps immediately to step 31 in program step 21 during an opened switch 18 for picking up the actual measuring value for the magnetic field H on sensor 10 with subsequent calculation of the driving direction in step 32 and the indication in step 33.

The invention is not limited to the illustrated exemplified embodiment. For example, with a correspondingly correct installation of the sensor an establishing of the correcting angle $\Delta\phi$ is not required, in that the so-called erroneous instruction is fed as a known practically unchangeable value in the evaluation circuit in the driving range of the motor vehicle and is then considered by the program of the evaluation circuit. Also, within the framework of this invention it is possible to omit the program step 34 for testing the driving direction change and to test with each program throughput whether the value of the magnetic field H measured by the magnetometer is present on the estabished polar frequency response locus O or whether a correction of the polar frequency response locus is required. By a correspondingly expanded program it can also be determined that a correction of the polar frequency is performed only if the deviation of the measuring values exceeds a defined magnitude. Moreover, it is irrelevant for the calibration of the electronic compass, whether the calibration is performed by one or two circular drives or by complete turning of vehicle 19, for example on a platform. It is essential for the invention that for establishing the direction of the ground field He and for establishing the driving direction in a vector diagram the measuring points with the maximum and minimum X and Y values of the elliptical polar frequency response locus O of the magnetic field H which is measured on the magnetometer are picked up, and that from this the vector of the fixed interference field Hs with the coordinates $X_p$ and $Y_p$ of the center point P are established and stored as parameters of the elliptical polar frequency response locus O, Thereafter the measuring points of the magnetic field H with the maximum and minimum radiuses a,b of the elliptical polar frequency response locus O are picked up and that from this the semiaxes are established and stored as further parameters for the polar frequency respone locus O. The turning angle is established and stored as a parameter of the polar frequency response locus O from the X and Y values of the center point P as well as the X and Y values of a measuring point with the minimum or maximum radius a or b of the polar frequency response locus O. Since the magnitude and the position of the elliptical polar curve of the measured magnetic field H can be determined from these parameters, finally the driving direction of the motor vehicle can be established and indicated during the drive from the given measured X and Y values of the magnetic field H by means of an algorithm.

We claim:

1. A method for establishing a driving direction of a vehicle being driven in which the vehicle has an electronic compass, the compass including a magnetometer and an evaluation circuit, the magnetometer being stationarily mounted in the vehicle and havng an X and Y axis, the magnetometer having at least two probes each with an axis arranged 90° relative to that of the other, the magnetometer cyclically measuring a magnetic field having an elliptic polar frequency response locus, the probes producing electrical signals in dependence upon the cyclically measured magnetic field, the evaluation circuit evaluating the electrical signals of the probes; the method comprising:

cyclically detecting first measuring points (M1 . . . M4) with the magnetometer (10) corresponding to maximum and minimum values of the elliptic polar frequency response locus (O) of the cyclical magnetic field (H);

initially establishing the first measuring points (M1 . . . M4) as values (x, y) in a vector diagram with X and Y axes corresponding to X and Y axes of the mangetometer to thereby define points on an ellipse corresponding to the elliptic polar frequency response locus (O);

first establishing and storing as a first parameter of the elliptic polar frequency response locus (O) in the evaluation circuit (11), a vector of a fixed interference field (Hs) having coordinates ($X_p$, $Y_p$) corresponding to a center point (P) of the ellipse based on the first measuring points;

establishing a direction of a ground field (He) and its angle with respect to the X-axis of the magnetometer (10) in the vector diagram based on the values of the measured point and the fixed interference field vector (Hs);

second establishing and storing as remaining parameters of the polar frequency response locus (O) in the evaluation circuit (11), semiaxes representing maximum and minimum radii (a, b) of the ellipse which extend from the center point (P) to respective second measuring points (M5 . . . M8) of the magnetic field (H);

third establishing and storing as an additional remaining parameter of the elliptic polar frequency response locus (O) in the evaluation circuit (11), an angle of axial rotation (α) of the ellipse relative to the X and Y axes in the vector diagram derived from the values (x, y) associated with at least one of the second measuring points (M5 ... M8) and from the coordinates of the center point (P); and establishing the driving direction of the vehicle during the driving from the stored parameters of polar frequency response locus (O) previously established and the values (x, y) of the cyclically measured magnetic field (H) previously established.

2. A method as defined in claim 1, further comprising:
monitoring and correcting the parameters of polar frequency response locus (O) and including detecting at least one additional measuring point (Mx);

establishing the additional measuring point (Mx) as an associated value in the vector diagram (x, y); and storing the additional measuring point (Mx) in the evaluation circuit (11).

3. A method as defined in claim 1, wherein the vehicle is driven in a full turn, the detecting including detecting a plurality of four of the first measuring points (M1 ... M4), the initially establishing including establishing the four of the measuring points in the vector diagram (x, y); and storing the detected four of the measuring points (M1 ... M4), the first establishing and storing including deriving the first parameter of polar frequency response locus (O) of the measured magnetic field (H) in the evaluation circuit (11) based on the detected four of the measuring points.

4. A method as defined in claim 3, wherein the detecting includes detecting a plurality of the second measuring points (M5 ... M8) during the turning; further comprising:

storing the detected plurality of second measuring points (M5 ... M8), both the second and third establishing and storing including deriving all of the remaining parameters of polar frequency response locus (O) of the measured magnetic field (H) based on the detected and stored plurality of second measuring points.

5. A method as defined in claim 4, further comprising:
detecting additional measured values (x, y) of the magnetic field (H) during the driving comparing the additional measured values (x, y) with stored values of the polar frequency response locus (O); and recalibrating by storing the additional measured values when the comparing indicates deviations in the polar frequency response locus (O).

* * * * *